(12) United States Patent
Xue

(10) Patent No.: US 9,047,529 B2
(45) Date of Patent: Jun. 2, 2015

(54) FORM RECOGNITION METHOD AND DEVICE

(71) Applicant: Alibaba Group Holding Limited, George Town (KY)

(72) Inventor: Hui Xue, Hangzhou (CN)

(73) Assignee: Alibaba Group Holding Limited (KY)

( * ) Notice: Subject to any disclaimer, the term of this patent is extended or adjusted under 35 U.S.C. 154(b) by 37 days.

(21) Appl. No.: 13/947,412

(22) Filed: Jul. 22, 2013

(65) Prior Publication Data
US 2014/0029853 A1 Jan. 30, 2014

(30) Foreign Application Priority Data
Jul. 24, 2012 (CN) .......................... 2012 1 0258883

(51) Int. Cl.
*G06K 9/00* (2006.01)
*G06K 9/18* (2006.01)

(52) U.S. Cl.
CPC .............. *G06K 9/18* (2013.01); *G06K 9/00449* (2013.01)

(58) Field of Classification Search
USPC ......... 382/181, 182, 190, 199, 203, 209, 219, 382/100, 137, 164, 174, 179, 321; 348/78, 348/E7.085; 435/5, 69.7, 440, 6.19, 320.1, 435/252.3; 506/13, 14
See application file for complete search history.

(56) References Cited

U.S. PATENT DOCUMENTS

| | | | |
|---|---|---|---|
| 5,680,478 A * | 10/1997 | Wang et al. .................... | 382/176 |
| 5,832,100 A * | 11/1998 | Lawton et al. ................. | 382/100 |
| 5,841,905 A | 11/1998 | Lee | |
| 6,115,497 A * | 9/2000 | Vaezi et al. .................... | 382/174 |
| 6,898,317 B2 | 5/2005 | Struble et al. | |
| 7,725,834 B2 | 5/2010 | Bell et al. | |
| 8,274,523 B2 | 9/2012 | Ptucha et al. | |
| 8,320,674 B2 * | 11/2012 | Guillou et al. ................. | 382/179 |
| 2002/0159639 A1 | 10/2002 | Shima | |

FOREIGN PATENT DOCUMENTS

| | | | | | |
|---|---|---|---|---|---|
| JP | 361000877 A | * | 1/1986 | ............... | G06K 9/00 |
| JP | 362032581 A | * | 2/1987 | ............... | G06K 9/00 |

OTHER PUBLICATIONS

Pizano, Arturo, M-I. Tan, and Naoto Gambo. "A business form recognition system." Computer Software and Applications Conference, 1991. COMPSAC'91., Proceedings of the Fifteenth Annual International. IEEE, 1991.

(Continued)

*Primary Examiner* — Anh Do
(74) *Attorney, Agent, or Firm* — Van Pelt, Yi & James LLP

(57) ABSTRACT

Embodiments of the present application relate to a form recognition method, a form recognition system, and a computer program product for recognizing forms. A form recognition method is provided. The method includes conducting a straight line detection of a form in a form binary image to acquire a plurality of form boundaries of the form and a plurality of positional relationships between the plurality of form boundaries, extracting a plurality of features from the form using the plurality of form boundaries and the positional relationships between the plurality of form boundaries, establishing a feature vector associated with the form based at least in part on the plurality of features, calculating similarities between the form and respective ones of a plurality of template forms based at least in part on the feature vector of the form, and identifying the form based on the calculated similarities.

21 Claims, 24 Drawing Sheets

(56) References Cited

OTHER PUBLICATIONS

Ting, Antoine, and Maylor KH Leung. "Form recognition using linear structure." Pattern Recognition 32.4 (1999): 645-656.

Ting, Antoine, et al. "A syntactic business form classifier." Document Analysis and Recognition, 1995., Proceedings of the Third International Conference on. vol. 1. IEEE, 1995.

* cited by examiner

| NW | NW | N | N | N | NE | NE |
|----|----|----|----|----|----|----|
| NW |  |  | N |  |  | NE |
| W |  |  | M |  |  | E |
| W | W | M | M | M | E | E |
| W |  |  | M |  |  | E |
| SW |  |  | S |  |  | SE |
| SW | SW | S | S | S | SE | SE |

FORM RECOGNITION METHOD AND DEVICE

CROSS REFERENCE TO OTHER APPLICATIONS

This application claims priority to People's Republic of China Patent Application No. 201210258883.7 entitled FORM RECOGNITION METHOD AND DEVICE, filed Jul. 24, 2012 which is incorporated herein by reference for all purposes.

FIELD OF THE INVENTION

The present application relates to a form recognition method and device.

BACKGROUND OF THE INVENTION

"Pattern recognition" refers to processing and analyzing information (numerical, textual, and logical relationship) on various forms of representative things and phenomena to describe, identify, categorize, and interpret such things and phenomena. As computer technology has been developing, computers have begun to be applied to pattern recognition to identify and categorize events or processes. The identified events or processes can include concrete objects such as characters, sounds, or pictures, or the identified events or processes can include abstract objects such as statuses or degrees.

For example, computers are being used to perform character recognition. Using Optical Character Recognition as an example, Optical Character Recognition (OCR) refers to a process whereby electronic equipment (for example, a scanner or a digital camera) examines characters printed on paper and determines the character's shapes by detecting patterns of darkness and brightness and then uses a character recognition method to translate the determined shapes into computer characters. In other words, text materials are scanned to generate image files and then the image files are analyzed to acquire character and layout information. The majority of text characters can be recognized using OCR.

However, the current application of computers for character recognition still has some limitations. For example, existing OCR technology often does not recognize forms in the image files scanned from the text materials very accurately. When the computer encounters a form, existing OCR technology often produces garbage characters and is unable to correctly identify the form.

BRIEF DESCRIPTION OF THE DRAWINGS

Various embodiments of the invention are disclosed in the following detailed description and the accompanying drawings.

FIG. 3B is a diagram of an embodiment of a horizontal straight line.

FIG. 4 is an embodiment of a form features diagram.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
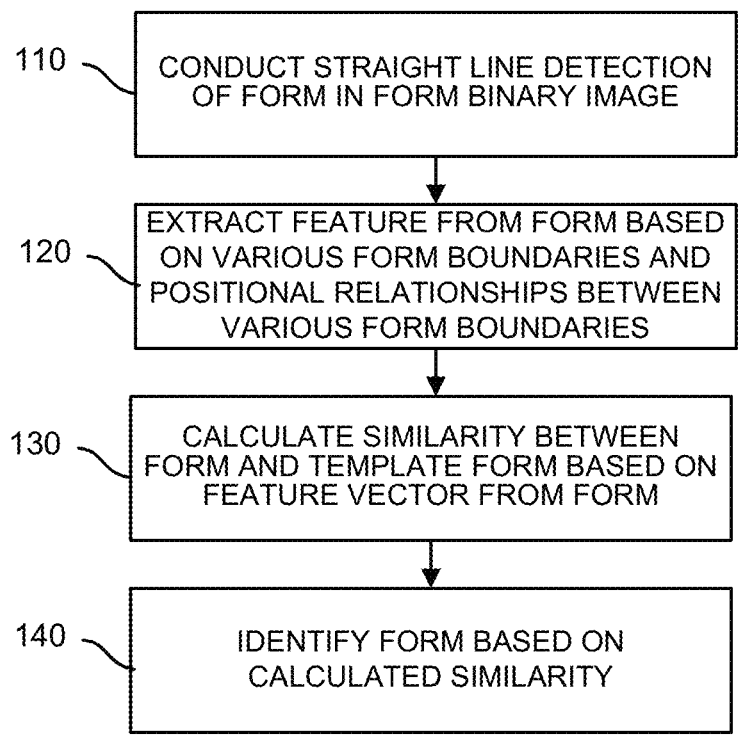
FIG. 1 is a flow chart of an embodiment of a form recognition process.

FIG. 1 is a flow chart of an embodiment of a form recognition process. The process 100 can be implemented by a server 2220 of FIG. 22 and comprises:

In 110, the server conducts a straight line detection of a form in a form binary image and acquires a plurality of form boundaries of the form and a plurality of positional relationships between the various form boundaries.

In the form, typically, line segments are clean and straight. The line segments, which when subject to the straight line detection, yield a plurality of form boundaries of the form and positional relationships between the plurality of form boundaries. The form boundaries in the form indicate the line segments in the form. The straight line detection can be implemented by a Hough Transform or another well known technique.

In 120, the server extracts a set of features from the form based on the plurality of form boundaries and the positional relationships between the plurality of form boundaries, and establishes a feature vector from the form. The feature vector indicates structural features of the form.

In 130, the server calculates similarities between the form and template forms based on the feature vector of the form.

In some embodiments, the "template forms" are forms stored in the server. Form models are established by performing straight line detection and feature extraction on sample form images. In some embodiments, the "template forms" are generated manually. In some embodiments, it is understood that the "template forms" are generated in other ways.

In 140, the server identifies the form based on the calculated similarities.

In some embodiments, the server performs straight line detection on a form in a form binary image such as BMP files, TIF files, JPEG files, GIF files, PNG files, etc. based on structural features of the form to obtain the line segments and the relationships between the line segments of the form. In other words, the server obtains the various form boundaries of the form and the positional relationships between the various form boundaries. Then, the server extracts feature on the form based on information relating to the form boundaries of the form and the positional relationships and acquires the feature vector of the form to acquire the structural features of the form. Subsequently, the form is matched against templates based on the structural features of the form to determine which template has the greatest similarity to the form, in other words, the most similar structure, vis-à-vis the form in question. A category of the form is determined based on the matching results. Conventional systems are usually unable to correctly identify forms in image files or form images, and accurately identify forms in the image files or forms in the form images for convenient and rapid input into a computer. For convenience, "forms in image files or form images" are collectively referred to as "form images" below.

Figure 2:
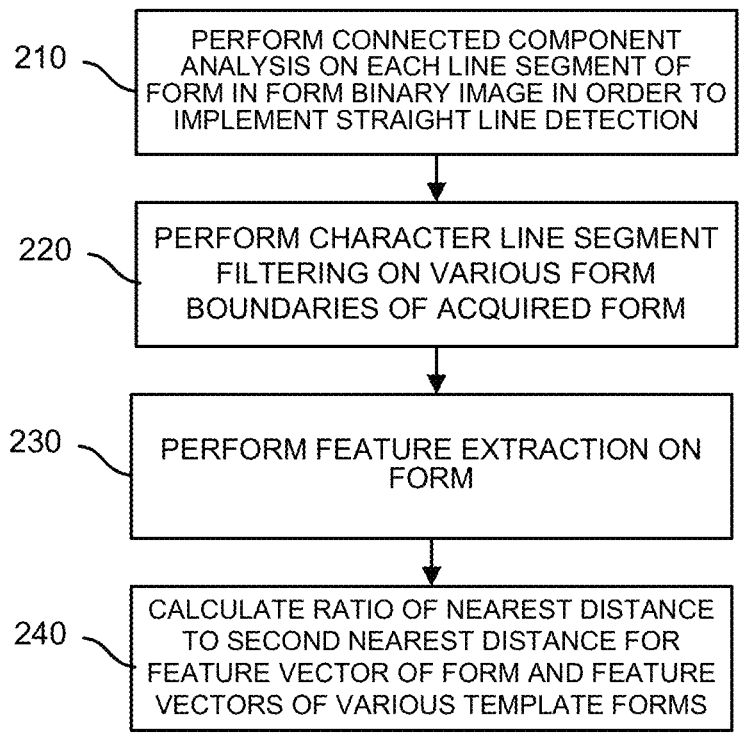
FIG. 2 is a flow chart of another embodiment of a form recognition process.

FIG. 2 is a flow chart of another embodiment of a form recognition process. The process 200 can be implemented by a server 2220 of FIG. 22 and comprises:

Firstly, the process 200 employs a connected component analysis to implement straight line detection on the form and implements a further optimization treatment on acquired form boundaries. Secondly, before performing form feature extraction, the process 200 performs character line segment filtering on the form boundaries. Furthermore, the process 200 achieves form feature extraction by extracting feature intersection points. In addition, the process 200 achieves precise form recognition by determining a ratio of the nearest distance to second nearest distance for the form and the template forms.

The process 200 is explained using the example of a simple 2×2 form in the shape of "囗".

In 210, the server performs a connected component analysis on each line segment of a form in a form binary image in order to implement a straight line detection, to acquire various form boundaries of the form and to acquire positional relationships between the various form boundaries.

In some embodiments, the server conducts the connected component analysis on each line segment, in other words, for each straight line of the form, the server uses a set point (for example, the set point corresponds to a start point, an end point, or any other set point on the straight line) on each straight line as the starting point. The connected component analysis is performed on adjacent pixels of the starting point, adjacent pixels of the pixel(s) deemed adjacent to the starting point, and so on, to acquire connected components of the straight line. Then, the server acquires the number of pixels of connected components perpendicular to each straight line for each pixel on the connected components of each straight line. The server acquires the average line width of each straight line based on the number of pixels of connected components perpendicular to each straight line for each pixel on the connected components of the straight line. The server determines whether the line width where each pixel is located on the connected components of the straight line is greater than the average line width. In the event that the line width is greater than the average line width, the server performs a line width removal treatment on the line width where pixels greater than the average line width are located. After performing the line width removal treatment, the server acquires form boundaries of the form based on each straight line that underwent the line width removal treatment. In some embodiments, at substantially the same time, the server also acquires positional relationships between the various form boundaries, such as form boundary A being perpendicular to form boundary B at the line segment start point, based on the positional relationships between the connected components.

Since the detected straight lines are mainly horizontal form lines and vertical form lines, the positional relationships include: up/down relationships between horizontal lines, left/right relationships between vertical lines, and intersecting relationships between horizontal and vertical lines, which either cross intersect or intersect at a corner. These positional relationships can be determined based on the end point coordinates of the straight lines.

In some embodiments, in the event that the server performs the line width removal treatment on the line width where the pixels greater than the average line width are located, the server removes the pixels greater than the average line width from the connected components of a straight line. Subsequently, the server determines whether the removed pixels were located within the straight line. In the event that the removed pixels were located within the straight line, the server performs a line segment merger on both sides of the removed pixels.

By performing the above process 200, the server is able to effectively processes form images of relatively poor quality, particularly form images that are fuzzy and rough.

Figure 3A:
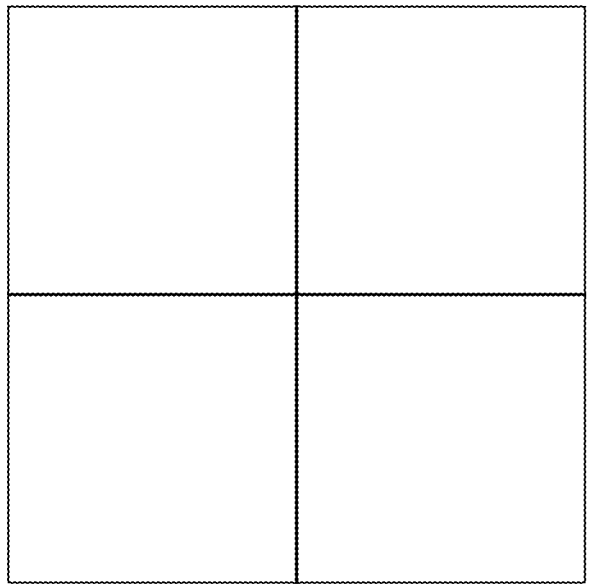
FIG. 3A is a diagram of an embodiment of a form.
Figure 3B:
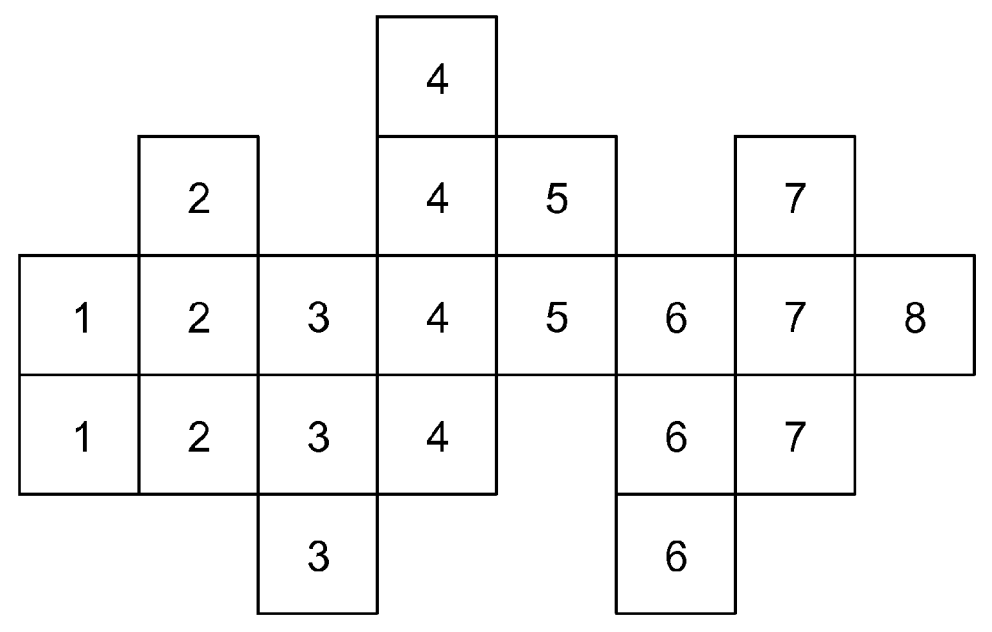

FIG. 3A is a diagram of an embodiment of a form. The form is a "田" shaped form. The example below is of a second horizontal line in the "田" shaped form. The form straight line detection process implemented by connected component analysis is explained. FIG. 3B is a diagram of an embodiment of a horizontal straight line.

A set point (for example, pixel 1 in FIG. 3B) of the second horizontal line is taken as a starting point to conduct the connected component analysis of the straight line. For example, the server sets the current pixel as a starting point pixel (in other words, pixel 1) of the second horizontal straight line and determines whether a next pixel adjacent to the current pixel in the horizontal direction (left side or right side) exists. In this example, the connected component analysis is also performed on the other pixel 1. In other words, the connected component analysis is performed on both pixel is or each pixel 1 to accommodate different line widths. The example shows that the next pixel is located on the right side of the starting point pixel. In the event that the next pixel adjacent to the current pixel in the horizontal direction exists, the server adds the next pixel to the connected component region and regards the added next pixel as the current pixel. The server again determines whether an adjacent pixel exists in the horizontal direction, and continues the determination until no pixel adjacent to the current pixel exists. Thus, the server obtains a straight line connected component (for example, pixels 1-2-3-4-5-6-7-8 of FIG. 3B). In some embodiments, when the form is simple and clear, as in the present example, the connected component of the second horizontal line covers the entire line. In some embodiments, in some complex forms, the connected component analysis performed on a straight line produces a plurality of connected components.

For each pixel on the connected component, the server considers pixels that are perpendicular to the line as one point on a straight line. For example, all the pixels in a vertical direction at pixel 1 of FIG. 3B are denoted as pixel 1 to accommodate different line widths. In this situation, obtaining the number of pixels of the connected components perpendicular to each pixel on the connected component of the straight line is possible. In some embodiments, this operation is performed on the straight line prior to performing the connected component analysis on the straight line. At this point, acquiring the number of pixels of the connected component perpendicular to the straight line for each pixel on the straight line is possible after the vertical connected components are acquired for the connected component of the second horizontal line.

The calculation of the average width of the line is based on the number of pixels of the connected components perpendicular to the line. In the above example, the average width of the line corresponds to the average number of vertical pixels on the second horizontal line. Assume that the average line width is N (pixels). For each pixel point on a connected component, in the event that the line width (number of vertical pixels) of a location of the connected component, in other words, the current position, is greater than a threshold value, or in the event that a ratio of the line width to N exceeds a predefined threshold value, a line width removal treatment is performed on the line width where the pixel point is located. For example, the pixel points having excess line width are removed, or the pixel points are removed from the connected components. In the event that the removed pixel points are located within the straight line, the straight line is broken into two segments. Then, the two line segments are merged. Using FIG. 3B as an example, N is the average line width of the horizontal straight line, which is (2+3+3+4+2+3+3+1)/8=21/8=2.625. Assuming that the threshold value of a ratio of the line width to N is 1.2, 1.2×2.625=3.15. In other words, if the number of vertical pixels exceeds 3.15, pixel removal is performed (for example, pixels 4 in FIG. 3B). In the event that the removed pixel appears in the middle of the straight line (for example, pixel 4 of FIG. 3B), the straight line is broken into two straight lines (1-2-3) and (5-6-7-8). Accordingly, eliminating the effects of noise, characters, and vertical lines is possible.

In some embodiments, straight line detection of vertical lines corresponds to the straight line detection of horizontal lines described above.

Returning to FIG. 2, in 220, the server performs character line segment filtering on the various form boundaries of the acquired form to remove lines that are deemed to be lines of characters. In some embodiments, character line segments are filtered out because the character line segments may be easily confused with form boundaries.

The character line segment filtering includes determining whether line segment lengths of the various form boundaries of the form are less than or equal to a set fourth threshold value. In the event that the line segment lengths of the various form boundaries of the form are less than or equal to the set fourth threshold value, the server removes form boundaries whose line segment length is less than or equal to the fourth threshold value.

In operation 220, the fourth threshold value is set in many ways. For example, the fourth threshold value is set based on test results, empirical values, or set in some other appropriate manner. In some embodiments, the fourth threshold value is set as follows: acquire the length of the largest connected component in the various form boundaries of the form and divide the length of the largest connected component into a plurality of length intervals, apportion each connected component in the various form boundaries based on a length of each connected component into a length interval among the plurality of length intervals, generate a line segment length distribution histogram based on the lengths of the plurality of length intervals and the number of connected components of the length intervals, and establish the length corresponding to the highest point of y-coordinate in the histogram as the fourth threshold value.

In some embodiments, the form boundaries of the acquired form have many character line segments. Typically, the length of the line segments (corresponding to character strokes) is small in comparison to the straight lines or the form boundaries and can be filtered out with a preset threshold value. In some embodiments, the preset threshold value is between 10-20 pixels; however, the preset threshold value can be set to other values. The use of character line segment filtering effectively improves the precision of form recognition and reduces the effects of characters on form recognition.

The above character line segment filtering operation is an optional operation and can be omitted in the case of some forms being in pure form images (in other words, forms only or forms without text or characters).

In 230, the server performs feature extraction on the form and acquires feature vectors from the form based on the various form boundaries after the various form boundaries have undergone character segment filtering and the positional relationships between the various form boundaries have been acquired.

In some embodiments, the server extracts the various intersection points of the form boundaries, acquires information on the various intersection points, and acquires information on horizontally oriented form boundaries and information on vertically oriented form boundaries from among the various form boundaries based on the various form boundaries and the positional relationships between the various form boundaries. The server acquires a feature vector of the form based on the information on the various intersection points, the information on the horizontally oriented form boundaries, and the information on the vertically oriented form boundaries.

For example, the simple "田" shaped form, as shown in FIG. 4, is a common form having a total of nine types of intersection points (also referred to as feature points) that can be extracted. Based on form characteristics, nine types of extractable feature points include: a northwestern feature point type (the three NW feature points in FIG. 4), a northern feature point type (the four N feature points in FIG. 4), a northeastern feature point (the three NE feature points in FIG. 4), an eastern feature point (the four E feature points in FIG. 4), a southeastern feature point (the three SE feature points in FIG. 4), a southern feature point (the four S feature points in FIG. 4), a southwestern feature point (the three SW feature points in FIG. 4), a western feature point (the four W feature points in FIG. 4), and a middle feature point (the five M feature points in FIG. 4).

A typical form has nine types of intersection points that can be extracted. The various types of intersection points are extracted using a start point coordinate and an endpoint coordinate of each previously extracted line segments.

In some embodiments, in addition to extracting the nine types of feature points, the server extracts information related to horizontal and vertical straight lines (in other words, form boundaries) such as quantity information. In other words, the server extracts the number of horizontal and vertical straight lines.

Accordingly, the server extracts 11 types of features in all. The server outputs these features as feature vectors descriptive of the structural features of the form, where the features relate to the feature points and the horizontal and vertical straight lines. For example, using FIG. 17 as an example, the occurrence of each dimension (N, NE, E, SE, S, SW, W, NW, M, H, V) is totaled to give an 11-dimensional feature vector (for example, (10, 1, 6, 1, 10, 1, 6, 1, 13, 8, 12)) for the form.

Feature points are not coordinates. Instead, the feature points are statistical values for various kinds of boundary features. In form images that have undergone straight line detection, the pixels have one of the following 11 statuses: a northwestern pixel, a northern pixel, a northeastern pixel, an eastern pixel, a southeastern pixel, a southern pixel, a southwestern pixel, a western pixel, a middle pixel, a horizontal line, and a vertical line. Coordinate values of the lines and pixels are not required. In order to obtain structural features of the form in the form image, the numbers of features belonging to each of the 11 types are counted.

Returning to FIG. 2, in 240, the server calculates the ratio of the nearest distance to the second nearest distance for the feature vector of the form and the feature vectors of the various template forms, and identifies the form based on the calculation. The various template forms have different number of rows, different number of columns, spacing differences, formatting differences, or any combination thereof.

In operation 240, "nearest distance" refers to the distance having the smallest value among all the distances from the feature vector of the form to the feature vectors of the various template forms. The template form corresponding to the nearest distance is the template form that, of all the template forms, is most similar to the form that is to be identified. The "second nearest distance" refers to having the second smallest value among all the distance values. Only the "nearest distance" is smaller than the "second nearest distance."

In the event that the ratio of the nearest distance to the second nearest distance is greater than or equal to a set ratio and the similarity between the form and the template form corresponding to the nearest distance is confirmed as the highest, and the form is considered to belong to the template form category. The template form category refers to the type of form represented by a template form, and can also be a template form In the event that the ratio of the nearest distance to the second nearest distance is smaller than the set value, the form is confirmed as dissimilar to all of the various template forms.

Figure 5:
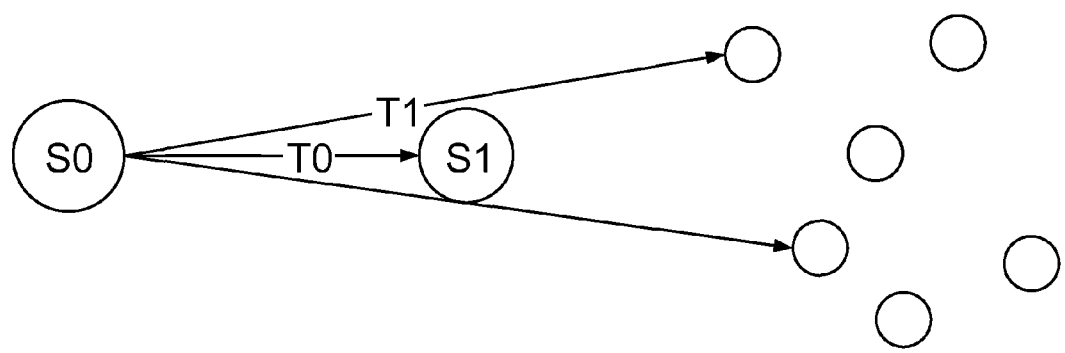
FIGS. 5 and 6 are diagrams of embodiments of forms being identified through distance similarity.
Figure 6:
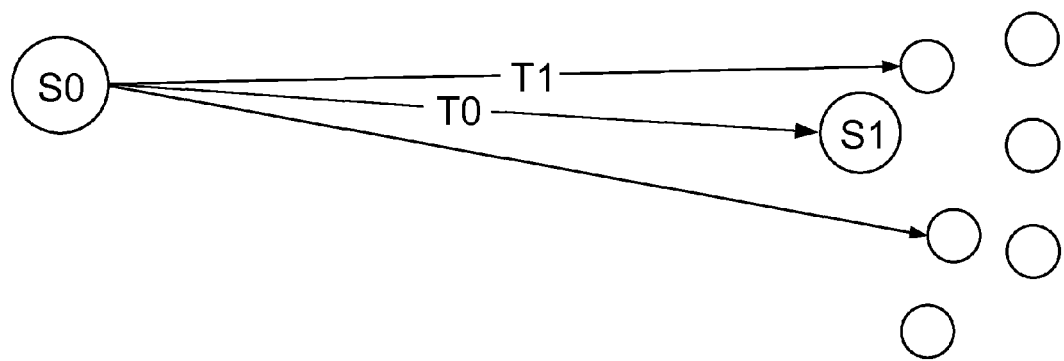

FIGS. 5 and 6 are diagrams of embodiments of forms being identified through distance similarity.

Many reasons for using the ratio of the nearest distance to the second nearest distance to identify the form exist. For example, assuming that the server has already extracted the "nearest distance," various methods exist to determine whether the input form belongs to a category. Even if the input form does not have a corresponding template form, a nearest distance value can be computed for the input form. One method for determining whether the input form belongs to the category includes setting a threshold value s. In the event that the nearest distance is less than s, the input form belongs to forms of that category. If the nearest distance is not less than s, the input form does not belong to any category in the form library. The drawback of this method is that it is rather difficult to come up with a clear cut s value. Such an s value can be determined only after a lot of manual testing. Another method is to set a threshold value s while also finding the second nearest distance and calculating the ratio between the nearest distance and the second nearest distance. In the event that the ratio is greater than s, the form is considered to belong to the "nearest distance" category, and in the event that the ratio is not greater than s, the form does not belong to any category in the form library, as shown in FIGS. 5 and 6. In the event that a large difference between the nearest distance and the second nearest distance exists, the input form is very likely to belong to the S0 category. As shown in FIG. 5, the difference between T0 and T1 (which represent the nearest and the second nearest distances, respectively) is quite large, and the input form belongs to the S0 category. In the event that a minimal difference between the nearest distance and the second nearest distance exists, the input form is not likely to belong to any category in the sample set. As shown in FIG. 6, since the difference between T0 and T1 is not sufficiently large, the input form is not likely to belong to any category in the sample set. Accordingly, the server effectively identifies the category to which a form belongs.

In order to determine whether a form belongs to a category, the Euclidian distance between the two vectors representing the two forms is calculated. For example, two identical forms have a distance of 0. The greater the difference between two forms, the greater the calculated distance.

To determine whether two forms are similar, a first way is to set a threshold. If the distance is less than the threshold, then the two forms are similar. However, different forms have different thresholds (for example, thresholds for complex forms are different from thresholds for simple forms).

A second way of determining whether two forms are similar is to set a relative threshold. For example, assuming that the relative threshold is 0.7 and that there are 100 different form templates. After a form is input, a search is conducted for the closest (N1) for template and next closest (N2) form template, and distances of T0 and T1 are calculated, respectively. The ratio of T0 and T1 are used to determine whether N1 is a form template that meets the relative threshold. If T0 and T1 are close then the input form and N1 are not matches; otherwise, if T0 is significantly less than T1, then the input form is a match with N1.

In some embodiments, the server acquires form boundaries by performing a connected component analysis on form image line segments. The form image line segments are straight lines. Typically, an input form has only two types of lines or line segments, and the server distinguishes between the line segments. The server subjects the form boundaries to a line width removal treatment and character line segment filtering to make the form boundaries more precise and effective. Structural features of the form are acquired by extracting form feature points. Subsequently, the server determines the template form most similar to the form based on a similarity analysis and thus identifies the form. Accordingly, the server correctly identifies forms in image files or form images, and accurately identifies forms in image files or forms in form images for convenient and rapid input of the same into computers.

Figure 7:
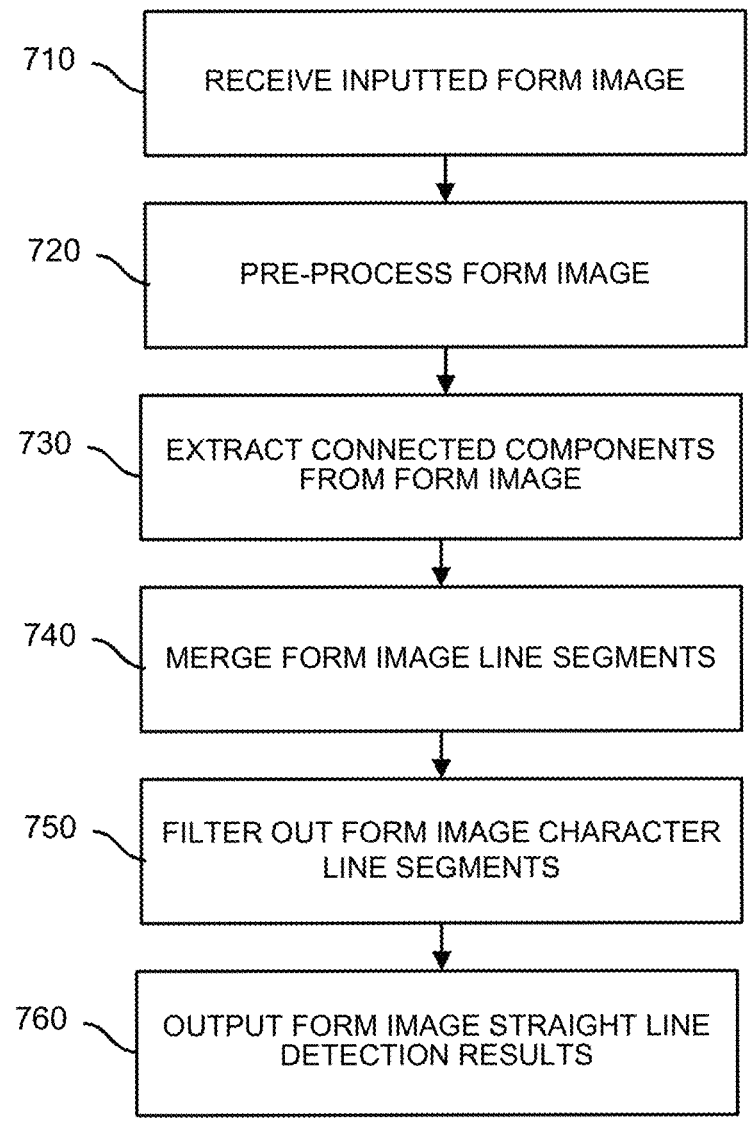
FIG. 7 is a flow chart of an embodiment of a form straight line detection process.

FIG. 7 is a flow chart of an embodiment of a form straight line detection process. In some embodiments, the process 700 is an implementation of operation 210 of FIG. 2 and comprises:

The process 700 describes the form straight line detection and the form category recognition aspects of the present application. In the form straight line detection aspect, the aspect includes operations relating to form boundary mergers. In the form category recognition aspect, the aspect includes operations relating to multi-resolution processing of forms. In addition, the establishment of form models is described.

First, the form straight line detection aspect comprises receiving a form image, pre-processing the form image, extracting form image connected component, merging form image line segments, filtering form image character line segments, and outputting detected form image straight lines.

In 710, the server receives an inputted form image.

The input image sources include screenshots, photo uploads, scanner uploads, or images obtained via other methods. Categories of input forms include electronic forms, paper notes, industrial drawings, etc.

In 720, the server pre-processes the form image.

The pre-processing includes grey scale processing and binary processing of the inputted form image. In some embodiments, the pre-processed output image includes only two colors: black and white.

In 730, the server extracts connected components from the form image.

In some embodiments, the server extracts straight lines based on the connected component method, which effectively avoids issues associated with slanting straight lines. For example, when scanning a form, the lines may not be scanned straight and instead are slanted. For these slanted lines, the typical horizontal/vertical scans are not suitable.

Figure 8:
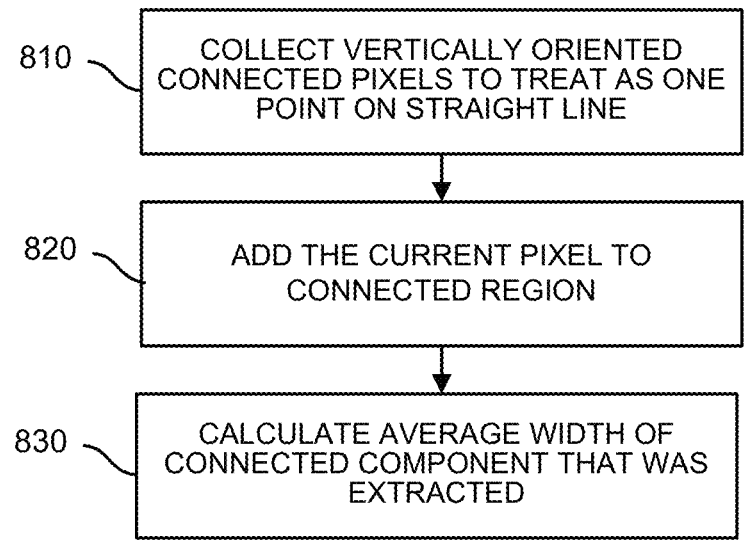
FIG. 8 is a flow chart of an embodiment of an extracting of connected components from a form image process.

FIG. 8 is a flow chart of an embodiment of an extracting of connected components from a form image process. In some embodiments, the process 800 is an implementation of operation 730 of FIG. 7 and comprises:

Because form boundaries typically exhibit structures that are substantially horizontal or vertical, the process 800 is used.

As an example, the process 800 detects horizontal straight lines.

In 810, the server collects vertically oriented connected pixels to treat as one point on a straight line. In some embodiments, the straight line is compatible with different line widths.

In view of the fact that some processed form images have poor quality, with fuzziness, roughness, and other such conditions, the pixels that are vertically connected to each pixel are regarded as elements of the straight line during horizontal straight line detection.

In 820, in the event that a pixel adjacent to the current pixel in the horizontal direction (left or right side) exists, the server adds the current pixel to the connected region.

In 830, the server calculates an average width (in other words, the average number of vertical pixels on the horizontal line) of the connected component that was extracted. Assume that the average width is N. In the event that, for each horizontal coordinate in the region, the ratio of the line width (number of vertical pixels) at the current position to N exceeds a threshold value, the server removes the current position from the connected component. In the event that the current position is within the straight line, the removal of the current position breaks the straight line into two segments. This operation reduces the effects of noise, characters, and vertical lines.

A vertical straight line detection method is similar to the horizontal straight line detection method and is implemented in a similar manner.

Referring again to FIG. 7, in 740, the server merges form image line segments.

Figure 13:
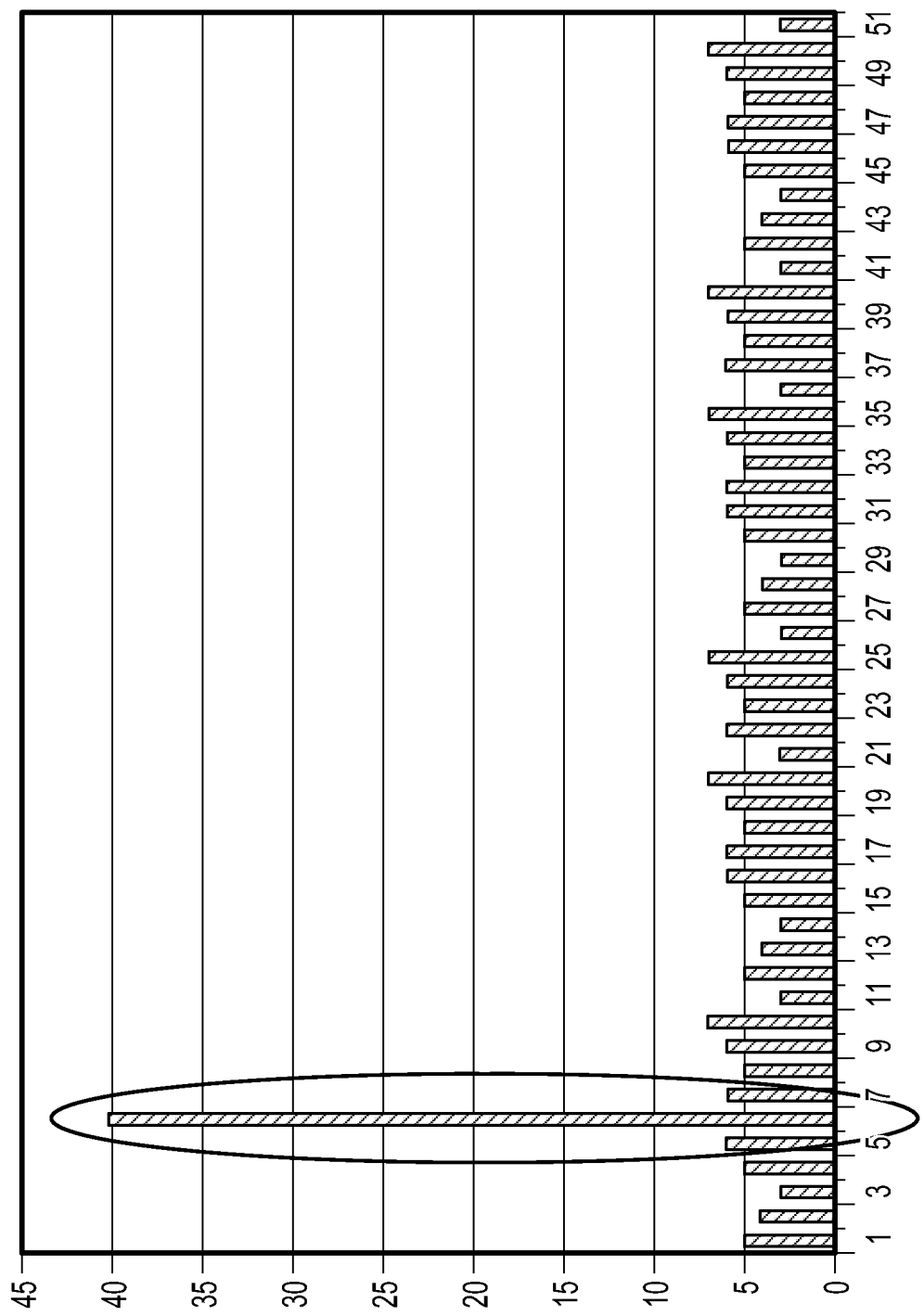
FIG. 13 is a diagram of an embodiment of a character line segment filtering in the form straight line detection.

Typically, character line segments are short in length, and the frequency of character line segments having the same length is high because many character line segments have a similar length. In FIG. 13, the histogram reflects a relatively concentrated distribution of character line segments, and typically the character line segments appear in a region having a short length.

The merging of the form image line segments includes merging multiple straight lines which were deemed to be originally a single line but for some reason became broken. During the merging operation, a rule based determination is made to determine whether two neighboring form boundaries extending in the same direction are to be merged into a line segment. If the two neighboring form boundaries are to be merged, the two neighboring form boundaries undergo a line segment merger. In some embodiments, A) the server acquires the distance of the two neighboring form boundaries extending in the same direction, compares the distance to a set first threshold value, and determines whether to perform a line segment merger based on the comparison of the distance to the set first threshold value, B) the server acquires the similarity of the two neighboring form boundaries extending in the same direction and determines whether to perform a line segment merger based on the similarity, or C) a combination thereof. An example of the first threshold value is 12 pixels. In some embodiments, A) the server acquires the similarity of the two neighboring form boundaries extending in the same direction and determines whether a line segment merger is to be performed based on the similarity, B) the server acquires an angle between the two neighboring form boundaries extending in the same direction, compares the angle to a set second threshold value, and determines whether a line segment merger is to be performed based on the comparison, C) the server acquires a parallel distance between the two neighboring form boundaries extending in the same direction, compares the parallel distance to a set third threshold value, and determines whether a line segment merger is to be performed based on the comparison, or D) any combination thereof. An example of the second threshold value is 5 degrees.

In other words, the merger of two straight line segments needs to meet at least one of the conditions below:

Condition A: The nearest distance between two line segments (in other words, the right end of the left side line and the left end of the right side line) is less than a set threshold value. In some embodiments, the threshold value is set to 12 pixels. In the event that the distance is less than the threshold value, the line break is considered to be normal and the two line segments are merged. As an aspect, the two lines are considered as having been originally separate and are not to be merged.

Figure 9A:
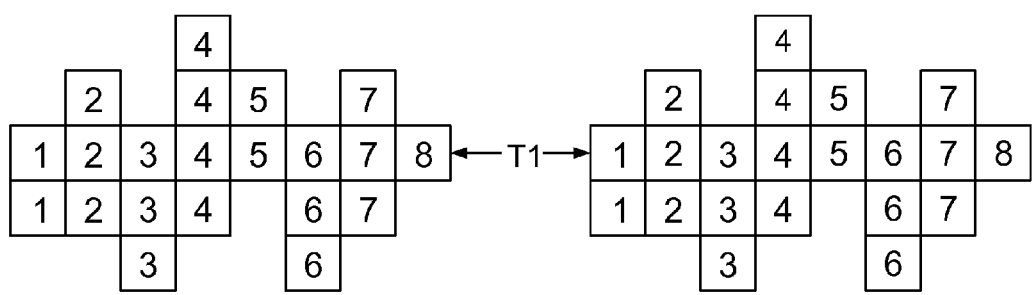
FIG. 9A is a diagram of an embodiment of a distance determination in a line segment merging in a form straight line detection.
Figure 9B:
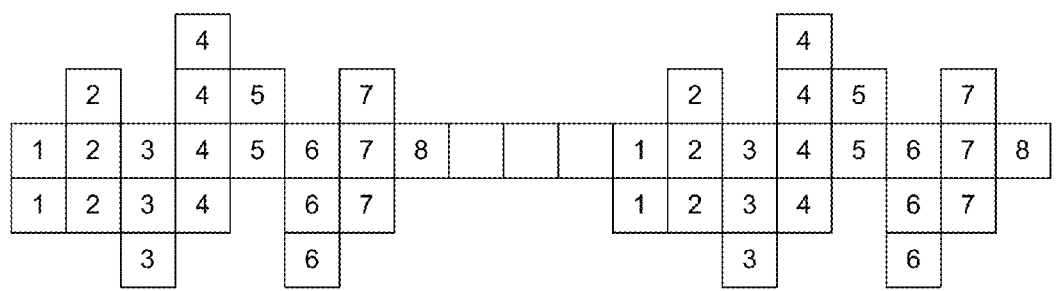
FIG. 9B is a diagram of an embodiment of a merged line segment.

FIG. 9A is a diagram of an embodiment of a distance determination in a line segment merging in a form straight line detection. When T1 is less than a set threshold value, the two line segments (left side connected component 1-2-3-4-5-6-7-8 and right side connected component 1-2-3-4-5-6-7-8) are merged. When T1 is greater than or equal to a set threshold value, the two line segments are not merged. FIG. 9B is a diagram of an embodiment of a merged line segment. The merged line segments have the gap filled in to form a merged line segment. In some embodiments, the gap is filled in with a line having width of 1 pixel. In some embodiments, the gap is filled in with a line having width of more than 1 pixel.

Condition B: A similarity of two line segments is less than a set threshold value. The similarity, in other words, the possibility that the line segments are of the same line, of two line segments is calculated.

The similarity calculation includes: Calculating the center pixel position of each straight line, and then employing a line fitting method (for example, a least squares method) to obtain an approximate expression of each straight line. Two measures to weigh the possibility that the two line segments are the same line are used.

Figure 10:
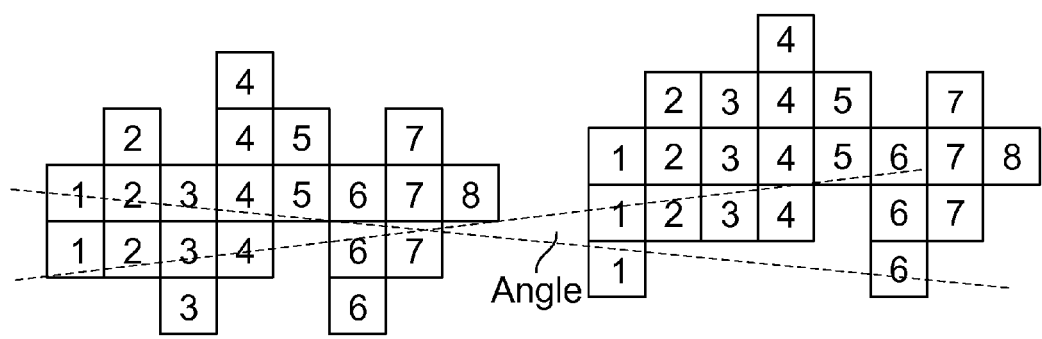
FIG. 10 is a diagram of an embodiment of an angle determination in line segment merging in a form straight line detection.

The first measure is based on determining an angle between the two line segments (which can be obtained through the cosine theorem). FIG. 10 is a diagram of an embodiment of an angle determination in line segment merging in a form straight line detection. The server calculates vertical center points of any two extracted connected components and fits the closest straight line based on the center points. The angle between the two connected components is calculated based on geometry, thus accomplishing the calculation of the angle between the connected components. The smaller the angle, the greater the likelihood that the two lines belong to the same straight line.

Figure 11:
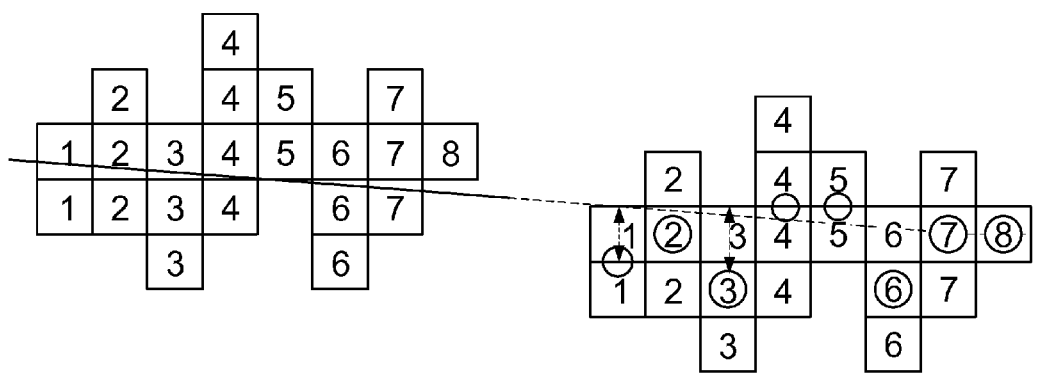
FIG. 11 is a diagram of an embodiment of a parallel line distance determination in a line segment merging in the form straight line detection.

The second measure is based on determining a parallel distance between the two connected components. In some embodiments, the parallel distance is expressed in terms of the sum of mean squares of the point line distance from second line segment pixel centers to the first line segment. FIG. 11 is a diagram of an embodiment of a parallel line distance determination in a line segment merging in the form straight line detection. In the case of any two extracted connected components, the server fits a straight line over the center of the left side connected component and then calculates the sum of squares for the distances from each center point of the right side connected component to the extended line. The server thereby calculates the parallel distance between the connected components. The smaller the parallel distance is, the greater the likelihood that the two lines are the same line. In some embodiments, the threshold value for the first measure is 5 degrees, and the threshold value for the second measure is twice the mean of the average line width squares of the second connected component. In other words, the two line segments are merged into a single line when the two line segments meet both of these conditions.

Line segment mergers are typically a remedial measure for some form images that are complex or have poor image quality and that are subject to the phenomenon of "form lines that were originally single lines being broken for one reason or another." The line segment merging is optional in the case of simple, sharp form images.

Referring again to FIG. 7, in 750, the server filters out form image character line segments.

In some embodiments, the results of the above line segment merger can contain character line segments. Typically, the length of the character line segments (for example, corresponding to character strokes) is small in comparison to a form boundary and is filtered out with a set threshold value. An example of the set threshold value is 20 pixels.

Figure 12:
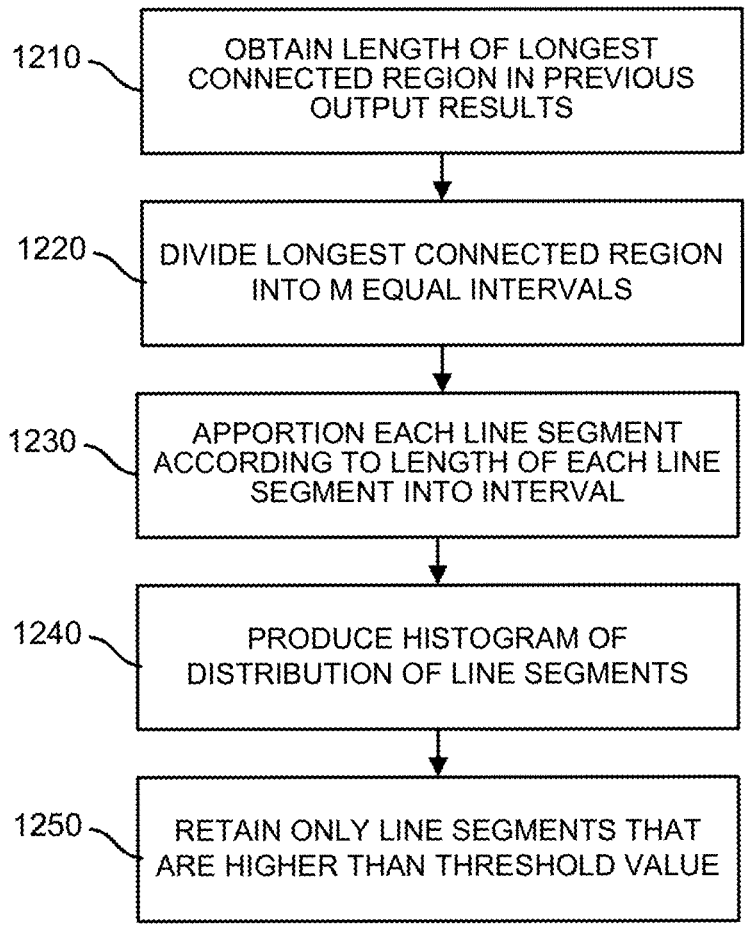
FIG. 12 is a flow chart of an embodiment of a form image character line segment extraction process.

FIG. 12 is a flow chart of an embodiment of a form image character line segment extraction process. In some embodiments, the process 1200 is an implementation of operation 750.

The process 1200 includes an automated threshold value extraction process which generates a histogram of line lengths based on the above output results.

In 1210, the server obtains the length of the longest connected region in the previous output results.

In 1220, the server divides the longest connected region into M equal intervals.

In 1230, for each line segment, the server apportions each line segment according to length of each line segment into an interval, and adds one to the counter for the interval.

In 1240, the server produces a histogram of the distribution of line segments based on the apportioned line segments. The server selects the length corresponding to the highest point to serve as the length of a character line segment. Thus, obtaining character widths and character heights in the horizontal and vertical directions, respectively, are possible and the server uses the character widths and the character heights as threshold values for screening line segments. The character widths and the character heights are not preconfigured but determined based on a histogram analysis. The segment length corresponding to the histogram's peak is used as the character line segment length.

In 1250, the server retains only the line segments that are higher than the threshold value (in other words, line segments apportioned to intervals to the right of the threshold value).

FIG. 13 is a diagram of an embodiment of a character line segment filtering in the form straight line detection. The above character line segment filtering process of FIG. 12 is explained in light of FIG. 13.

As an example, all lengths are expressed in number of pixels. Assuming that the length of the longest connected component (represented by the longest straight line that was detected) is 500, let M=100. In other words, the entire space is demarcated into a total of 100 intervals (0, 5, 10, . . . , 495, 500). The server generates a histogram based on pixel lengths of the detected straight lines in the entire form image. The x-coordinates are pixel intervals, and the y-coordinates are frequencies. Please note that "M=100" only serves as an illustrative example. In actual applications, the value of M can be set according to actual conditions. In the event that the picture is large, many pixels will exist. Accordingly, M is increased or decreased as appropriate.

The above straight line detection outputs a plurality of straight line segments (containing true form boundaries and character stroke line segments). In almost all situations, form boundaries are longer and less numerous than character stroke line segments (especially where dense text is included). Therefore, this operation detects the threshold value given the peak value (the length of the character line segment corresponding to the circled part in FIG. 13) and retains only the line segments (the true form boundaries) greater than the threshold value.

In some embodiments, character line segment filtering requires training During a training or recognition process, an input form image includes a large amount of text input content. In the event that the amount of characters input to the form is greater that a set value, the input characters produces smaller straight lines relative to the form boundaries, which will have an impact on subsequent operations. Filtering out character line segments and reducing the impact of textual input content on form recognition to increase precision.

Returning to FIG. 7, in 760, the server outputs form image straight line detection results.

In addition, for each line segment, the server retains: Pstart: start point coordinate; Pend: endpoint coordinate; L: length; and W: average width.

After performing the straight line detection on the form, the server performs form category recognition.

Figure 14:
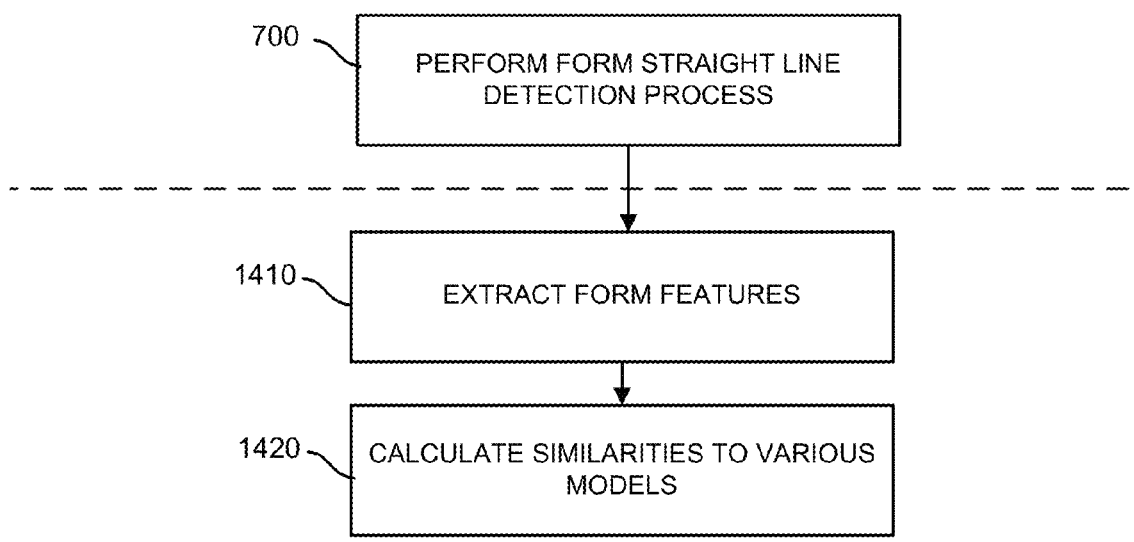
FIG. 14 is a flow chart of an embodiment of a form category recognition process.

FIG. 14 is a flow chart of an embodiment of a form category recognition process. The process 1400 is performed after the process 700 of FIG. 7 and comprises.

In 1410, the server extracts form features.

Different types of forms have different structures. In some embodiments, a general approach is used to describe forms, obtain form structural features, and determine form categories based on the form structural features.

Figure 15:
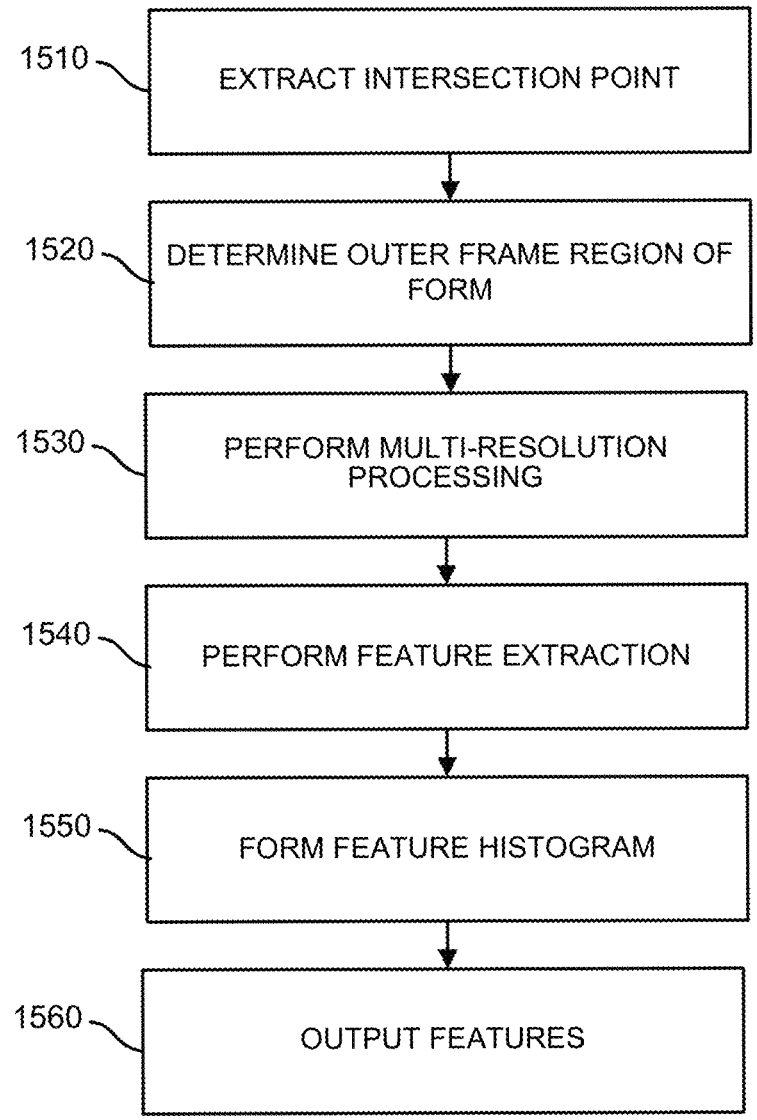
FIG. 15 is a flow chart of an embodiment of an extraction of form features process.

FIG. 15 is a flow chart of an embodiment of an extraction of form features process. In some embodiments, the process 1500 is an implementation of operation 1410 and comprises:

In 1510, the server extracts an intersection point (feature point). A common form has a total of nine types of intersection points that can be extracted. Each previously extracted line segment includes at least a start point coordinate and an endpoint coordinate, which can be used to extract feature points. Referring to FIG. 4, in some embodiments, feature point extraction is based on form characteristics including nine types of feature points being extracted: a northwestern feature point, a northern feature point, a northeastern feature point, an eastern feature point, a southeastern feature point, a southern feature point, a southwestern feature point, a western feature point, and a middle feature point.

Figure 16:
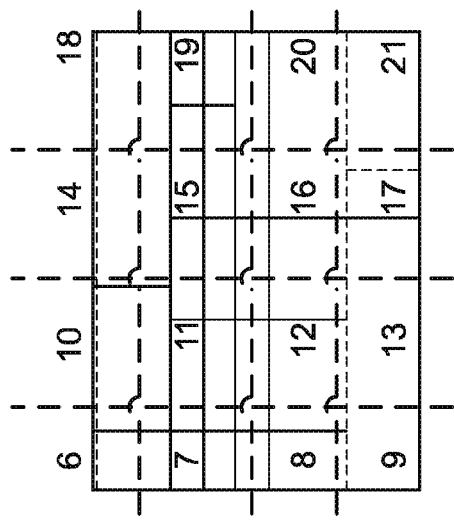
FIG. 16 is a diagram of a multi-level, layered form undergoing a form category recognition.
Figure 16:
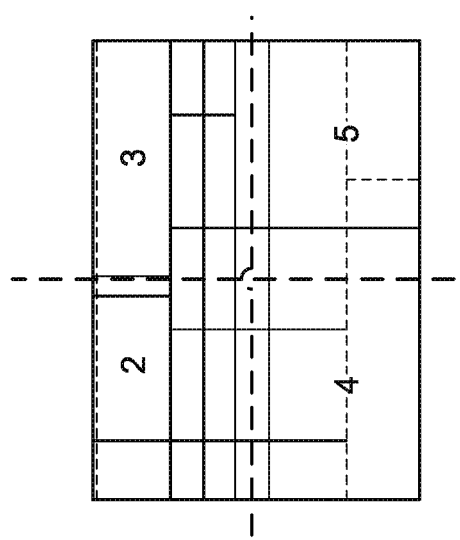
Figure 16:
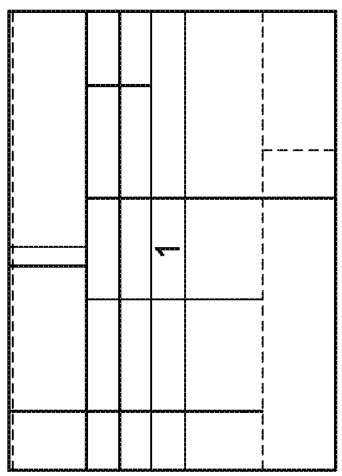
Figure 17:
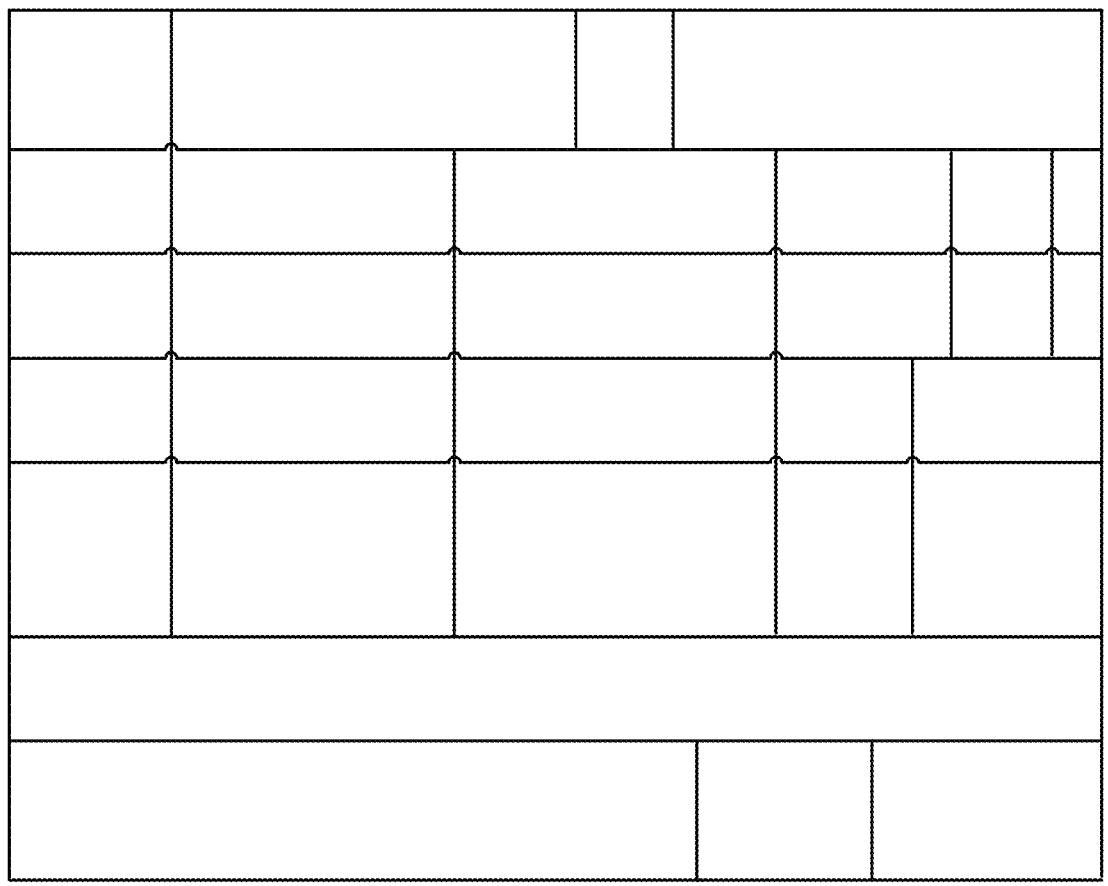
FIG. 17 is a chart of output results following straight line detection performed on a form.
Figure 18:
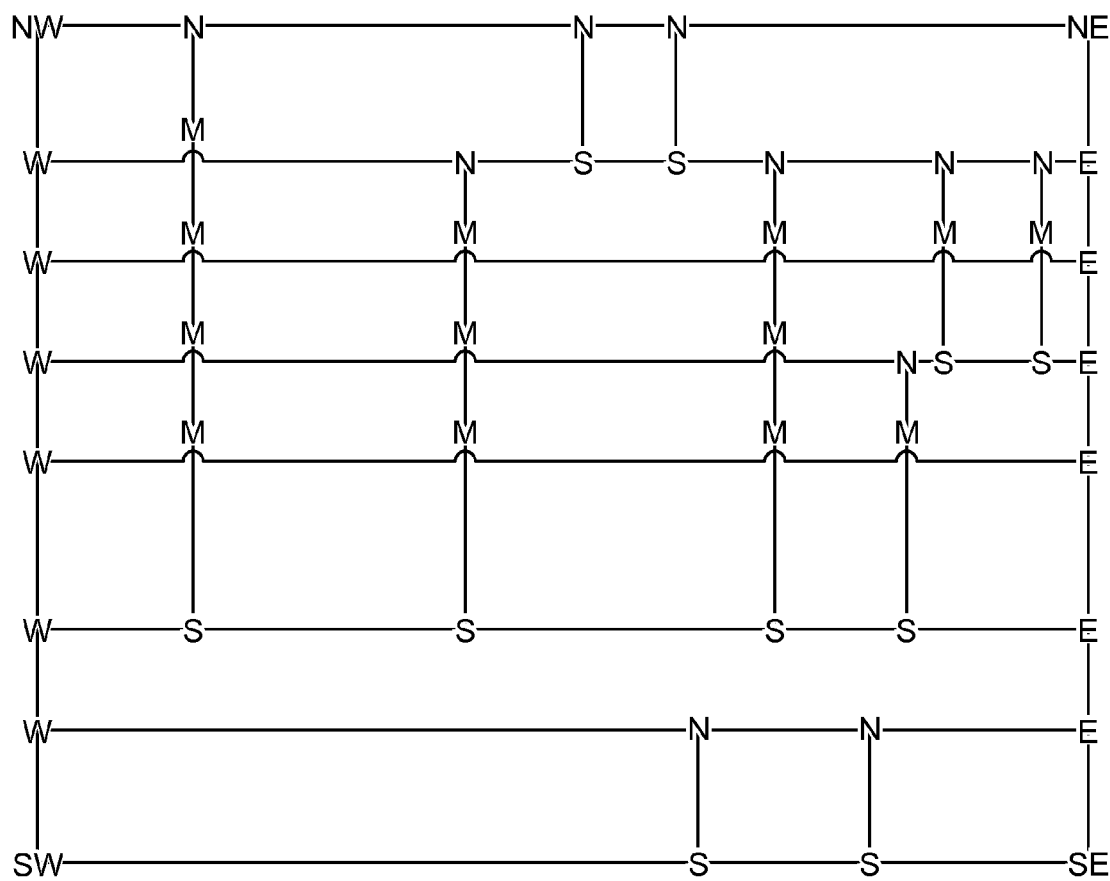
FIG. 18 is a diagram of feature points following feature point extraction performed on a form output result.

FIG. 16 is a diagram of a multi-level, layered form undergoing a form category recognition. FIG. 17 is a chart of output results following straight line detection performed on a form. FIG. 18 is a diagram of feature points following feature point extraction performed on a form output result.

Using the form in FIG. 16 as an example, the output form, after the form has undergone straight line detection, is shown in FIG. 17. The form depicted in FIG. 17 undergoes intersection point extraction, as shown in FIG. 18, where NW indicates a northwestern feature point, N indicates a northern feature point, NE indicates a northeastern feature point, E indicates an eastern feature point, SE indicates a southeastern feature point, S indicates a southern feature point, SW indicates a southwestern feature point, W indicates a western feature point, and M indicates a middle feature point. In addition, the number of horizontal lines (H=8) and the number of vertical lines (V=12) exists. The occurrences of each dimension (N, NE, E, SE, S, SW, W, NW, M, H, V) are totaled to give an 11-dimensional (10, 1, 6, 1, 10, 1, 6, 1, 13, 8, 12) feature vector for this form based on these dimensions.

Multi-resolution processing is performed on the form in order to achieve an increased precision. Under multi-resolution processing, the feature vector of the form is the total of each of the above dimension features under different sub-windows.

Returning to FIG. 15, in 1520, the server determines an outer frame region of the form. The outer frame region of the form is determined based on the above extracted four corner feature points.

In 1530, the server performs multi-resolution processing. After obtaining the region where the form is located, the first step is to normalize the size of the form, for example, uniformly contracting or expanding the form to 640×480. The server divides the normalized image into N×N blocks. As shown in FIG. 16, an original image is divided a 3 levels.

At a first level, 11 dimensions are extracted from the original image. Next, at a second level, the original image is divided into 2*2=4 subregions, so that there are 4*11=44 dimensions. At a third level, the original image is divided into 4*4=16 subregions, so that there are 16*11=176 dimensions. The dimensions of the first, second and third levels are summed so that the total number of dimensions=11+44+176=231.

In 1540, the server performs feature extraction. A total of 11 types of features are extracted with the present example. The 11 types of features include the nine feature quantities extracted in operation 1520, as well as the horizontal and vertical lines. In other words, the server extracts intersection points from each block of form in a multi-block form based on the various form boundaries and positional relationships between the various form boundaries within each block of the form, extracts the various intersection points of the form boundaries in each block of the form, acquires information on the various intersection points in each block of the form, and acquires information on horizontally oriented form boundaries and information on vertically oriented form boundaries in each block of the form.

In 1550, the server forms a feature histogram. The feature quantities for the various image sub-windows are extracted from the multi-level, layered image of FIG. 16. The feature quantities are then merged to form the feature histogram. As for the three-layer image in FIG. 16, features with a total of (1+4+16)×11=231 dimensions are extracted.

In 1560, the server outputs features. The above 231 dimension features are regarded as a feature vector output for describing the form's structure.

From the above, the use of the 11-dimensional vector for form recognition could result in large number of errors (for example, not enough dimensions, insufficient information, etc.), but recognition accuracy is increased via multi-resolution processing. For example, by using the three resolutions in the text (1, 2×2, 4×4), the final result ends up being 11×21=231 dimensions for increased recognition accuracy.

In 1420, the server calculates the similarities to various models (template forms) and determines the form category to which the form belongs.

For example, the Euclidian distances from feature vector of the input form to feature vectors of the various template forms are calculated. In the event that that the input form belongs to a form template library is known, the server directly returns the form type with the shortest Euclidian distance. Otherwise, the server calculates the similarities of the form to the various models.

Figure 19:
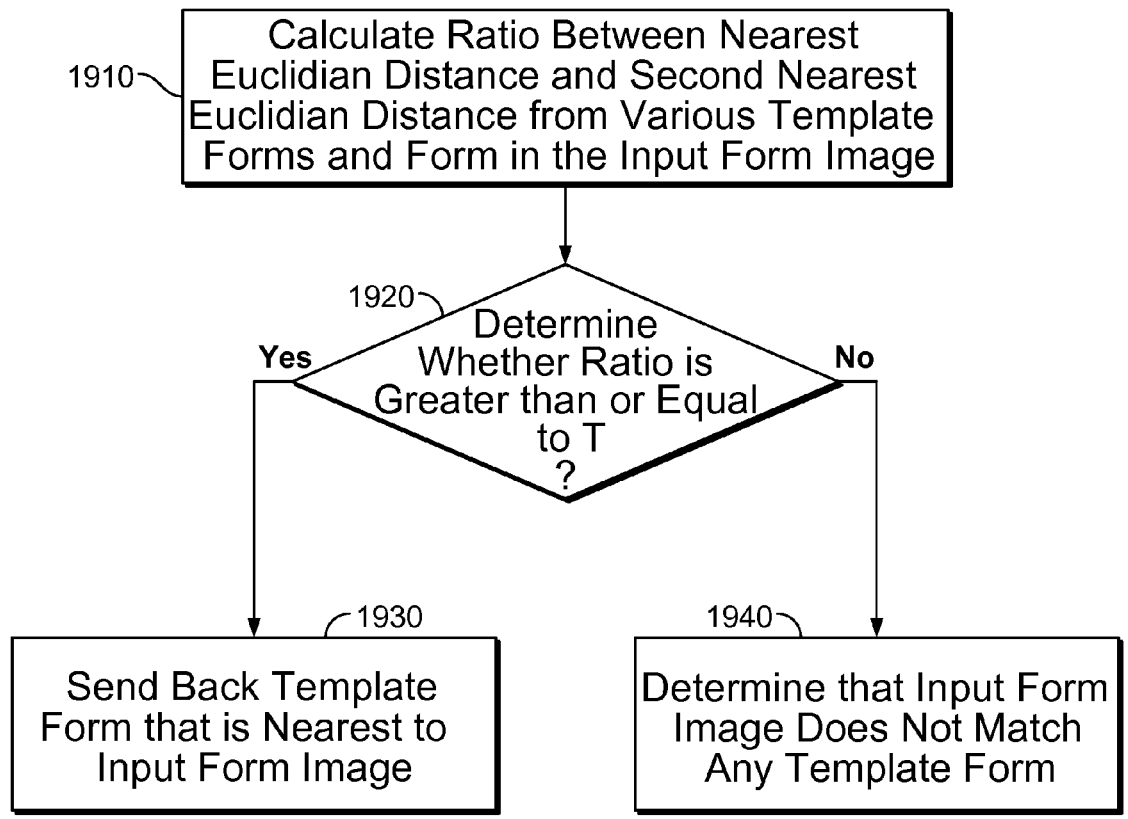
FIG. 19 is a flow chart of an embodiment of a calculation of similarities of a form to various models process.

FIG. 19 is a flow chart of an embodiment of a calculation of similarities of a form to various models process. In some embodiments, the process 1900 is an implementation of operation 1420 and comprises:

In 1910, the server calculates the ratio between the nearest Euclidian distance and the second nearest Euclidian distance from various template forms and the form in the input form image.

In 1920, the server determines whether the ratio is greater than or equal to T.

In 1930, in the event that the ratio is greater than or equal to T, the server sends back a template form that is nearest to the input form image.

In 1940, in the event that the ratio is less than T, the server determines that the input form image does not match any template form. In some embodiments, T is set to 3.

Figure 20:
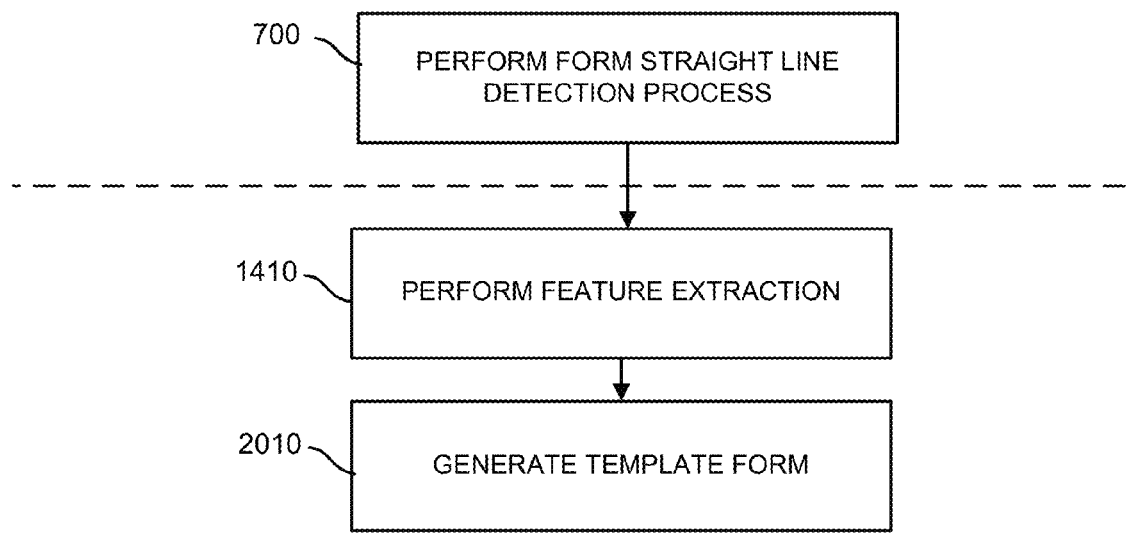
FIG. 20 is a flow chart of an embodiment of an establishing of a form model process.

FIG. 20 is a flow chart of an embodiment of an establishing of a form model process. In some embodiments, the process 2000 is implemented after operation 1410 of FIG. 14 and comprises:

In this example, a form model (i.e., a template form) is set up via the process 2000. The process 2000 includes: sample picture (form template) input, sample picture straight line detection and extraction, sample picture feature extraction, and form model establishment.

In some embodiments, the sample picture (form template) input and sample picture straight line detection and extraction proceeds with reference to the relevant sections of form straight line detection process 700. As for sample picture feature extraction, the feature extraction can proceed with reference to operation 1410.

In 2010, after feature extraction on the form in the sample picture and extraction of feature vectors are performed, the server regards these feature vectors as model output that describes the category of form and thus generates a template form.

For example, different form templates (such as Invoice A, Form B, Reimbursement Form C) are prepared. The system subjects the different form templates to straight line detection and feature extraction. The final training output result is that each form model corresponds to a multi-dimensional vector (for example, 231 dimensions), as shown below: A: {231-dimension vector}, B: {231-dimension vector}, and C: {231-dimension vector}.

An automatic recognition process for form picture structures is provided. The automatic recognition process powerfully counteracts the brightness, slopes, breaks, noise, and different line segment widths in straight line detection of form pictures. In some embodiments, input form images are acquired through screenshots, photography, scanner uploads, or other methods. In some embodiments, image sources are electronic forms or hand drawn charts. Moreover, no requirement for picture quality exists. When a sample library contains many template forms, a method exists for describing form features which, through training, automatically recognizes the categories to which individual input forms belong. Moreover, excluding the training process, the entire recognition process can be automated without any manual interference.

Figure 21:
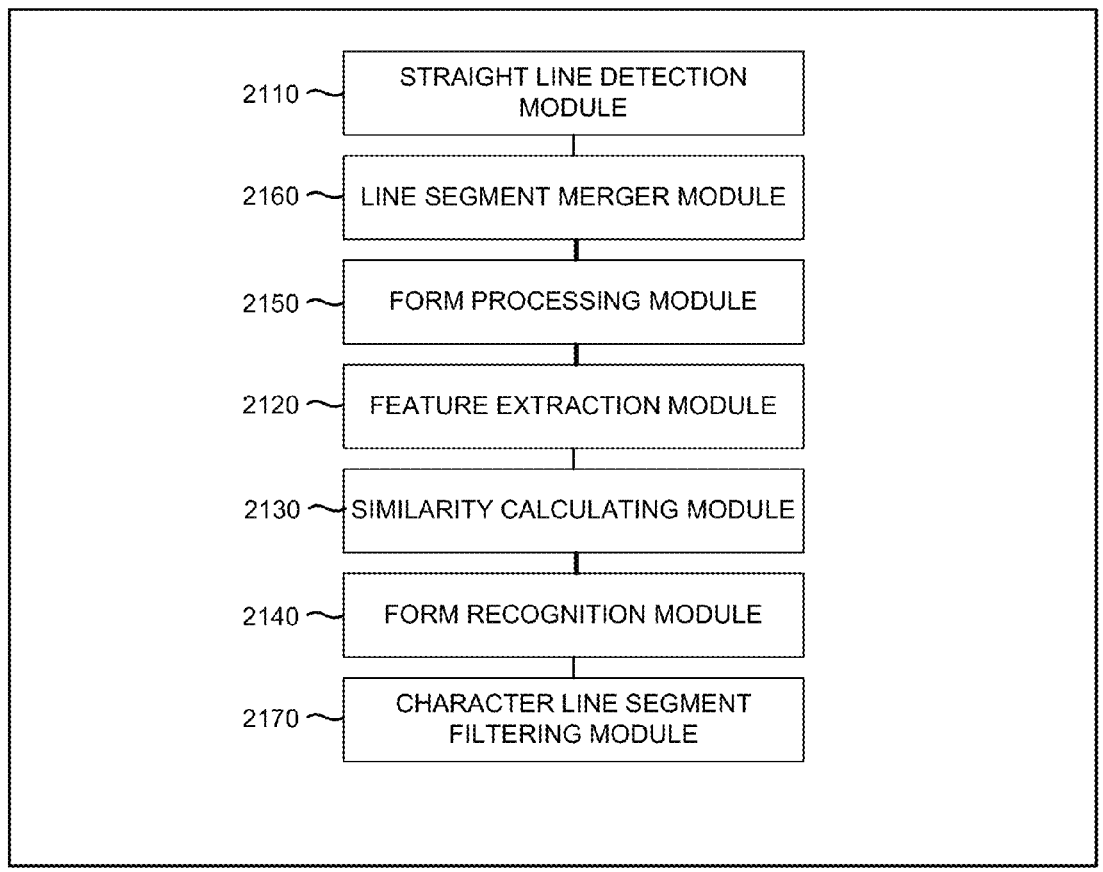
FIG. 21 is a structural block chart of an embodiment of a form recognition device.

FIG. 21 is a structural block chart of an embodiment of a form recognition device. In some embodiments, the device 2100 is an implementation of the server 2220 of FIG. 22 and comprises a straight line detection module 2110, a feature extraction module 2120, a similarity calculating module 2130, and a form recognition module 2140.

The straight line detection module 2110 conducts a straight line detection of a form in a form binary image and acquires various form boundaries of the form and positional relationships between the various form boundaries.

The feature extraction module 2120 extracts a feature from the form and acquires a feature vector from the form based on the various form boundaries and the positional relationships between the various form boundaries. The feature vectors indicate structural features of the form.

The similarity calculating module 2130 calculates similarities between the form and template forms based on the feature vector of the form.

The form recognition module 2140 identifies the form based on the calculated similarities.

In some embodiments, the straight line detection module 2110 uses a set point on each straight line on the form as a starting point; conducts a connected component analysis on adjacent pixels on each straight line; acquires connected components of each straight line; acquires the number of pixels of the connected components perpendicular to each straight line for each pixel on the connected components of each straight line; acquires the average line width of each straight line based on the number of pixels of the connected components perpendicular to each straight line for each pixel on the connected components of each straight line; determines whether the line width where each pixel is located on the connected components of each straight line is greater than the average line width; in the event that the line width where each pixel is located on the connected components of each straight line is greater than the average line width, performs a line width removal treatment on the line width where pixels greater than the average line width are located; and acquires the various form boundaries of the form and the positional relationships among the various form boundaries based on each straight line that underwent the line width removal treatment.

In some embodiments, when the straight line detection module 2110 performs a line width removal treatment on the line width where pixels greater than the average line width are located; removes pixels having a greater than the average line width from the connected components of the straight line; determines whether positions of the pixels that were removed are within the straight line; and in the event that the positions of the pixels that were removed are within the straight line, merges line segments on the both sides of the pixels that were removed.

In some embodiments, the feature extraction module 2120 extracts the various intersection points of the form boundaries based on the various form boundaries and the positional relationships between the various form boundaries; acquires information on the various intersection points; acquires information on horizontally oriented form boundaries and information on vertically oriented form boundaries from among the various form boundaries; acquires a feature vector of the form based on the information on the various intersection points, the information on the horizontally oriented form boundaries, and the information on the vertically oriented form boundaries.

In some embodiments, the form recognition device 2100 further comprises a form processing module 2150.

The form processing module 2150 determines, prior to the extracting of the various intersection points of the form boundaries, the region of the form and performs a normalization treatment on the form based on the region of the form.

In some embodiments, the form processing module 2150 divides the form into a plurality of blocks after the form has been normalized, and the feature extraction module 2120 extracts intersection points from each block of the form in the plurality of blocks form based on the various form boundaries and the positional relationships between the various form boundaries within each block of the form; extracts various intersection points of the form boundaries in the block of the form; acquires information on the various intersection points in the block of form; acquires information on horizontally oriented form boundaries and information on vertically oriented form boundaries in the block of form; and acquires a feature vector of the form based on the information on the various intersection points, the information on the horizontally oriented form boundaries, and the information on the vertically oriented form boundaries in each form block.

In some embodiments, the similarity calculating module 2130 calculates the ratio of the nearest distance to the second nearest distance for the feature vector of the form and feature vectors of the various template forms; in the event that the ratio is greater than or equal to a set ratio, determines similarity between the form and the template form corresponding to the nearest distance to be the highest; and in the event that the ratio is less than the set ratio, determines the form to be dissimilar to each of the various template forms.

In some embodiments, the form recognition device 2100 further comprises a line segment merger module 2160.

Before the performing of the feature extraction on the form and the acquiring of the feature vector from the form, the line segment merger module 2160 determines whether two form boundaries that are adjacent extending in the same direction is to undergo a line segment merger based on a set rule; and in the event that the two form boundaries that are adjacent extending in the same direction is to undergo the line segment merger, performs the line segment merger on the two adjacent form boundaries.

In some embodiments, the line segment merger module 2160 acquires the distance between two adjacent form boundaries extending in the same direction and determines whether the line segment merger is to be performed based on the result of comparing the distance to a set first threshold value, acquires similarity of two adjacent form boundaries extending in the same direction based on the result of comparing the distance to the set first threshold value, or a combination thereof; determines whether a line segment merger is to be performed; and in the event that the line segment merger is to be performed, merges the two adjacent form boundaries.

In some embodiments, when the line segment merger module 2160 acquires the similarity of two adjacent form boundaries extending in the same direction and determines whether the line segment merger is to be performed based on the similarity, the line segment merger module 2160 acquires an angle between the two adjacent form boundaries extending in the same direction and determines whether line segment merger is to be performed based on the result of comparing the angle to a set second threshold value; acquires the parallel distance between two adjacent form boundaries extending in the same direction and determines whether line segment merger is to be performed based on the result of comparing the parallel distance to a set third threshold value; or a combination thereof.

In some embodiments, the form recognition device 2100 further comprises a character line segment filtering module 2170.

Before the feature extraction module 2120 extracts the feature from the form and acquires feature vectors from the form based on the various form boundaries and the positional relationships between the various form boundaries, the character line segment filtering module 2170 performs character line segment filtering of the various form boundaries of the form.

In some embodiments, the character line segment filtering module 2170 determines whether the line segment lengths of the various form boundaries of the form are less than or equal to a set fourth threshold value; and in the event that the line segment lengths of the various form boundaries of the form are less than or equal to the set fourth threshold value, removes form boundaries whose line segment length is less than or equal to the fourth threshold value.

In some embodiments, the fourth threshold value is set as follows: the device 2100 acquires the length of the largest connected component in the various form boundaries of the form and divides the length into a plurality of length intervals; apportions each connected component in the various form boundaries based on length into a length interval among the plurality of length intervals; generates a line segment length distribution histogram based on the lengths of the plurality of length intervals and the number of connected components of each of the length intervals; and sets the length corresponding to the highest point of the y-coordinate in the histogram as the fourth threshold value.

The form recognition device 2100 implements at least one of the above form recognition methods. Moreover, the form recognition device 2100 has the beneficial results of the corresponding processes. Thus, the device 2100 will not be further discussed for conciseness.

Figure 22:
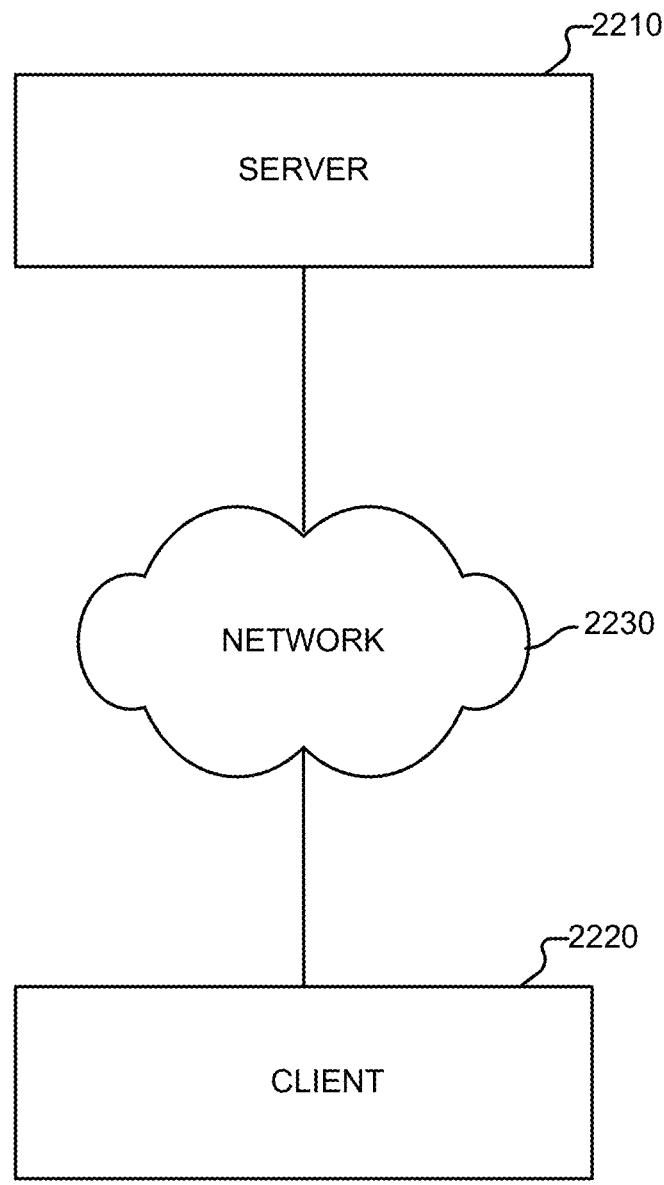
FIG. 22 is a structural diagram of an embodiment of a system for form recognition.

FIG. 22 is a structural diagram of an embodiment of a system for form recognition. The system 2200 includes a client 2210 connected to the server 2220 via a network 2230.

The present application provides an automatic recognition process for form images which includes two main parts: a straight line detection and form category determination of input form images. Regarding the straight line detection, the present application provides a process for extracting straight lines based on a connected component analysis. This process enables accurate, sharp extractions of form boundaries. The form category determination provides a process for performing multi-resolution feature extraction on forms. This process can increase the accuracy of form recognition.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A form recognition method performed using at least one processor, comprising:

conducting a straight line detection of a form in a form binary image to acquire a plurality of form boundaries of the form and a plurality of positional relationships between the plurality of form boundaries;

extracting a plurality of features from the form using the plurality of form boundaries and the positional relationships between the plurality of form boundaries;

establishing a feature vector associated with the form based at least in part on the plurality of features, wherein the feature vector indicates structural features of the form;

calculating similarities between the form and respective ones of a plurality of template forms based at least in part on the feature vector of the form; and identifying the form based on the calculated similarities.

2. The method as described in claim 1, wherein the conducting of the straight line detection of the form in the form binary image comprises:

based on a set point on a straight line on the form as a starting point, conducting connected component analysis on adjacent pixels on the straight line and acquiring connected components of the straight line;

acquiring a number of pixels of the connected components perpendicular to the straight line for each pixel on the connected components of the straight line;

acquiring an average line width of the straight line based on the number of pixels of the connected components perpendicular to the straight line for a pixel on the connected components of the straight line;

determining whether a line width where the pixel is located on the connected components of the straight line is greater than the average line width;

in the event that the line width where the pixel is located on the connected components of the straight line is greater than the average line width, performing a line width removal treatment on the line width where the line width of the pixel being greater than the average line width is located; and acquiring the plurality of form boundaries of the form and the positional relationships between the plurality of form boundaries based on the straight line that underwent the line width removal treatment.

3. The method as described in claim 2, wherein the performing of the line width removal treatment on the line width where the line width of the pixel being greater than the average line width is located comprises:

removing the pixel greater than the average line width from the connected components of the straight line;

determining whether the pixel that was removed is within the straight line; and in the event that the pixel that was removed is within the straight line, merging line segments on both sides of the pixels that were removed.

4. The method as described in claim 1, further comprising:

before the extracting of the plurality of features from the form using the plurality of form boundaries and the positional relationships between the plurality of form boundaries:

determining whether two form boundaries that are adjacent extending in the same direction require line segment merger based on a set rule; and in the event that the two form boundaries that are adjacent extending in the same direction require line segment merger based on the set rule, performing line segment merger on the adjacent two form boundaries.

5. The method as described in claim 4, wherein the determining of whether the two form boundaries that are adjacent extending in the same direction require line segment merger based on the set rule comprises:

A) determining a distance between the two adjacent form boundaries extending in the same direction;

comparing the distance to a set first threshold value; and determining whether line segment merger is to be performed based on the comparing;

B) determining a similarity of the two adjacent form boundaries extending in the same direction; and determining whether the line segment merger is to be performed based on the similarity; or C) a combination of A) and B).

6. The method as described in claim 5, wherein the determining of the similarity of the two adjacent form boundaries extending in the same direction comprises:

A) determining an angle between the two adjacent form boundaries extending in the same direction;

comparing the angle to a set second threshold value; and determining whether line segment merger is to be performed based on the comparing;

B) determining a parallel distance between the two adjacent form boundaries extending in the same direction;

comparing the parallel distance to a set third threshold value; and determining whether the line segment merger is to be performed based on the comparing; or C) a combination of A) and B).

7. The method as described in claim 2, further comprising:

before the extracting of the plurality of features from the form using the plurality of form boundaries and the positional relationships between the plurality of form boundaries, performing character line segment filtering of the plurality of form boundaries of the form.

8. The method as described in claim 7, wherein the performing of the character line segment filtering of the plurality of form boundaries of the form comprises:

determining whether line segment lengths of the plurality of form boundaries of the form are less than or equal to a set fourth threshold value; and in the event that the line segment lengths of the plurality of form boundaries of the form are less than or equal to the set fourth threshold value, removing a form boundary whose line segment length is less than or equal to the fourth threshold value.

9. The method as described in claim 8, wherein the fourth threshold value is set by at least:

acquiring a length of a largest connected component in the plurality of form boundaries of the form and dividing the length into a plurality of length intervals;

apportioning each connected component in the plurality of form boundaries based on length of the each connected component into a length interval among the plurality of length intervals;

generating a line segment length distribution histogram based on lengths of the plurality of length intervals and a number of connected components of each of the length intervals; and assigning a length corresponding to the highest value of the y-coordinate in the histogram as the fourth threshold value.

10. The method as described in claim 1:

wherein the extracting of the plurality of features from the form using the plurality of form boundaries and the positional relationships between the plurality of form boundaries comprises:

extracting a plurality of intersection points of the plurality of form boundaries based on the plurality of form boundaries and the positional relationships between the plurality of form boundaries;

acquiring information on the plurality of intersection points; and acquiring information on horizontally oriented form boundaries and information on vertically oriented form boundaries from the plurality of form boundaries; and wherein the establishing of the feature vector associated with the form based at least in part on the plurality of features comprises acquiring the feature vector of the form based on the information on the plurality of intersection points, the information on the horizontally oriented form boundaries, and the information on the vertically oriented form boundaries.

11. The method as described in claim 10, further comprising:

before the extracting of the plurality of intersection points of the plurality of form boundaries based on the plurality of form boundaries and the positional relationships between the plurality of form boundaries:

determining a region of the form; and performing normalization treatment on the form based on the region of the form.

12. The method as described in claim 11, further comprising:

after the performing of the normalization treatment on the form, dividing the form into a plurality of blocks, wherein the extracting of the plurality of intersection points of the plurality of form boundaries based on the plurality of form boundaries and the positional relationships between the plurality of form boundaries and the acquiring of the information on the plurality of intersection points, and the acquiring of the information on horizontally oriented form boundaries and the information on vertically oriented form boundaries from the plurality of form boundaries comprises:

extracting an intersection point from a block of form in the form based on the plurality of form boundaries and the positional relationships between the plurality of form boundaries within each of the blocks of the form;

extracting the intersection point of the form boundaries in the block of the form;

acquiring information on the intersection point in the block of the form; and acquiring information on horizontally oriented form boundaries and information on vertically oriented form boundaries in the block of the form.

13. The method as described in claim 1, wherein the calculating of the similarities between the form and the respective ones of the plurality of template forms based at least in part on the feature vector of the form comprises:

calculating a ratio of the nearest distance to the second nearest distance for the feature vector of the form and a feature vector of a template form of the plurality of template forms;

in the event that the ratio is greater than or equal to a set ratio, determining a similarity between the form and the template form corresponding to the nearest distance to be the highest; and in the event that the ratio is less than the set ratio, determining the form to be dissimilar to the template form.

14. A form recognition system, comprising:

at least one processor configured to:

conduct a straight line detection of a form in a form binary image to acquire a plurality of form boundaries of the form and a plurality of positional relationships between the plurality of form boundaries;

extract a plurality of features from the form using the plurality of form boundaries and the positional relationships between the plurality of form boundaries;

establish a feature vector associated with the form based at least in part on the plurality of features, wherein the feature vector indicates structural features of the form;

calculate similarities between the form and respective ones of a plurality of template forms based at least in part on the feature vector of the form; and identify the form based on the calculated similarities; and a memory coupled to the at least one processor and configured to provide the at least one processor with instructions.

15. The system as described in claim 14, wherein the conducting of the straight line detection of the form in the form binary image comprises:

based on a set point on a straight line on the form as a starting point, conducting connected component analysis on adjacent pixels on the straight line and acquiring connected components of the straight line;

acquiring a number of pixels of the connected components perpendicular to the straight line for each pixel on the connected components of the straight line;

acquiring the average line width of the straight line based on the number of pixels of the connected components perpendicular to the straight line for a pixel on the connected components of the straight line;

determining whether a line width where the pixel is located on the connected components of the straight line is greater than the average line width;

in the event that the line width where the pixel is located on the connected components of the straight line is greater than the average line width, performing a line width removal treatment on the line width where the line width of the pixel being greater than the average line width is located; and acquiring the plurality of form boundaries of the form and the positional relationships between the plurality of form boundaries based on the straight line that underwent the line width removal treatment.

16. The system as described in claim 15, wherein the performing of the line width removal treatment on the line width where the line width of the pixel being greater than the average line width is located comprises:

removing the pixel greater than the average line width from the connected components of the straight line;

determining whether the pixel that was removed is within the straight line; and in the event that the pixel that was removed is within the straight line, merging line segments on both sides of the pixels that were removed.

17. The system as described in claim 14:

wherein the extracting of the plurality of features from the form using the plurality of form boundaries and the positional relationships between the plurality of form boundaries comprises:

extracting a plurality of intersection points of the plurality of form boundaries based on the plurality of form boundaries and the positional relationships between the plurality of form boundaries;

acquiring information on the plurality of intersection points; and acquiring information on horizontally oriented form boundaries and information on vertically oriented form boundaries from the plurality of form boundaries; and wherein the establishing of the feature vector associated with the form based on at least in part on the plurality of features comprises acquiring the feature vector of the form based on the information on the plurality of intersection points, the information on the horizontally oriented form boundaries, and the information on the vertically oriented form boundaries.

18. The system as described in claim 17, wherein the at least one processor is further configured to:

before the extracting of the plurality of intersection points of the plurality of form boundaries based on the plurality of form boundaries and the positional relationships between the plurality of form boundaries:

determine a region of the form; and
perform normalization treatment on the form based on the region of the form.

19. The system as described in claim 18:

wherein the at least one processor is further configured to, after the performing of the normalization treatment on the form, divide the form into a plurality of blocks; and wherein the extracting of the plurality of intersection points of the plurality of form boundaries based on the plurality of form boundaries and the positional relationships between the plurality of form boundaries and the acquiring of the information on the plurality of intersection points, and the acquiring of the information on horizontally oriented form boundaries and the information on vertically oriented form boundaries from the plurality of form boundaries comprises:

extracting an intersection point from a block of form in the form based on the plurality of form boundaries and the positional relationships between the plurality of form boundaries within each of the blocks of the form;

extracting the intersection point of the form boundaries in the block of the form;

acquiring information on the intersection point in the block of the form; and acquiring information on horizontally oriented form boundaries and information on vertically oriented form boundaries in the block of the form.

20. The system as described in claim 14, wherein the calculating of the similarities between the form and the respective ones of the plurality of template forms based at least in part on the feature vector of the form comprises:

calculating a ratio of the nearest distance to the second nearest distance for the feature vector of the form and a feature vector of a template form of the plurality of template forms;

in the event that the ratio is greater than or equal to a set ratio, determining a similarity between the form and the template form corresponding to the nearest distance to be the highest; and in the event that the ratio is less than the set ratio, determining the form to be dissimilar to the template form.

21. A computer program product for recognizing forms, the computer program product being embodied in a non-transitory computer readable storage medium and comprising computer instructions for:

conducting a straight line detection of a form in a form binary image to acquire a plurality of form boundaries of the form and a plurality of positional relationships between the plurality of form boundaries;

extracting a plurality of features from the form using the plurality of form boundaries and the positional relationships between the plurality of form boundaries;

establishing a feature vector associated with the form based at least in part on the plurality of features, wherein the feature vector indicates structural features of the form;

calculating similarities between the form and respective ones of a plurality of template forms based at least in part on the feature vector of the form; and identifying the form based on the calculated similarities.

* * * * *